United States Patent
Nimmagadda et al.

(10) Patent No.: US 12,254,211 B2
(45) Date of Patent: Mar. 18, 2025

(54) METHOD OF ACCESSING NVMEOF MEMORY REGION OF A REMOTE TARGET DEVICE BY A HOST CPU

(71) Applicant: SAMSUNG ELECTRONICS CO., LTD., Suwon-si (KR)

(72) Inventors: Venkataratnam Nimmagadda, Karnataka (IN); Sandeep Kumar Ananthapalli, Karnataka (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 42 days.

(21) Appl. No.: 17/806,148

(22) Filed: Jun. 9, 2022

(65) Prior Publication Data
US 2023/0056733 A1 Feb. 23, 2023

(30) Foreign Application Priority Data
Aug. 17, 2021 (IN) .............................. 202141037370

(51) Int. Cl.
*G06F 3/06* (2006.01)
(52) U.S. Cl.
CPC .......... *G06F 3/0655* (2013.01); *G06F 3/0604* (2013.01); *G06F 3/0679* (2013.01)
(58) Field of Classification Search
CPC ...... G06F 3/0604; G06F 3/061; G06F 3/0631; G06F 3/0632; G06F 3/0655;
(Continued)

(56) References Cited

U.S. PATENT DOCUMENTS 11,436,112 B1 * 9/2022 Kumar ................. G06F 11/2046
2019/0250845 A1 * 8/2019 Kabra ................. G06F 13/1673
(Continued)

OTHER PUBLICATIONS

NVM Express Workgroup, NVM Express over Fabrics, Oct. 22, 2019, NVM Express Inc., Revision 1.1, pp. 1-83.*
(Continued)

*Primary Examiner* — Ilwoo Park
(74) *Attorney, Agent, or Firm* — F. Chau & Associates, LLC

(57) ABSTRACT

A method of accessing a Non-Volatile Memory express over Fabrics (NVMeoF) memory region of a remote target device includes establishing a NVMeoF transport connection with the remote target device and creating an admin queue by sending a NVMeoF connect command to the remote target device. The method includes accessing the NVMeoF memory region of the remote target device by sending PropertyGet/PropertySet commands to an admin submission queue of the remote target device, performing one of (a) receiving PropertyGet/PropertySet completion queue entries from the remote target device when accessing the NVMeoF memory region of the remote target device is completed, or (b) receiving at least one of RDMA write and RDMA read requests from the remote target device in response to PropertyGet/PropertySet submission queue entries, and receiving completion queue entries from the remote target device when the accessing of the NVMeoF memory region of the remote target device is completed.

7 Claims, 14 Drawing Sheets

(58) Field of Classification Search
CPC ...... G06F 3/0659; G06F 3/067; G06F 3/0679; G06F 13/14; G06F 13/1642; G06F 13/1668; G06F 15/17331; H04L 67/14; H04L 67/141; H04L 67/142; H04L 67/143
USPC .... 709/212, 216, 219, 227, 228, 229; 710/5; 711/154
See application file for complete search history.

(56) References Cited

U.S. PATENT DOCUMENTS

2020/0004445 A1\* 1/2020 Benisty ................ G06F 3/0664
2022/0187992 A1\* 6/2022 Malakapalli .......... G06F 3/0656

OTHER PUBLICATIONS

NVM Express Workgroup, NVM Express Base Specification, May 13, 2021, NVM Express Inc., Revision 2.0, pp. 1-440.\*

\* cited by examiner

FIG. 1B

| SQE | Byte3 | Byte2 | Byte1 | Byte0 |
|---|---|---|---|---|
| CDW0-9 | Command header ||||
| CDW10 | Reserved ||| ATTRIB |
| CDW11 | OFFSET ||||
| CDW12 | Reserved ||||
| CDW13 | ||||
| CDW14 | ||||
| CDW15 | ||||
| CQE | Byte3 | Byte2 | Byte1 | Byte0 |
| CDW0 | Command Specific DWORDS (PMR/CMB DWORDS) ||||
| CDW1 | ||||
| CDW2 | Reserved ||| SQHD |
| CDW3 | Status ||| CID |

FIG. 1C

| SQE | Byte3 | Byte2 | Byte1 | Byte0 |
|---|---|---|---|---|
| CDW0-9 | Command header ||||
| CDW10 | Reserved | Reserved || ATTRIB |
| CDW11 | OFFSET ||||
| CDW12 |  ||||
| CDW13 | Reserved ||||
| CDW14 |  ||||
| CDW15 |  ||||
| CQE | Byte3 | Byte2 | Byte1 | Byte0 |
| CDW0 | Command Specific DWORDS (PMR/CMB DWORDS) ||||
| CDW1 |  ||||
| CDW2 | Reserved || SQHD ||
| CDW3 | Status || CID ||

121 — Command header
123 — ATTRIB
125 — OFFSET

FIG. 1D

| SQE | Byte3 | Byte2 | Byte1 | Byte0 |
|---|---|---|---|---|
| CDW0-9 | Command header | | | |
| CDW10 | Reserved | | | ATTRIB |
| CDW11 | OFFSET | | | |
| CDW12 | VALUE | | | |
| CDW13 | | | | |
| CDW14 | Reserved | | | |
| CDW15 | | | | |
| CQE | Byte3 | Byte2 | Byte1 | Byte0 |
| CDW0 | Reserved | | | |
| CDW1 | | | | |
| CDW2 | Reserved | | SQHD | |
| CDW3 | Status | | CID | |

FIG. 1E

| SQE | Byte3 | Byte2 | Byte1 | Byte0 | |
|---|---|---|---|---|---|
| CDW0-9 | Command header | | | | —121 |
| CDW10 | Reserved | Reserved | | ATTRIB | —123 |
| CDW11 | OFFSET | | | | —125 |
| CDW12 | | | | | |
| CDW13 | VALUE | | | | —127 |
| CDW14 | | | | | |
| CDW15 | Reserved | | | | |
| CQE | Byte3 | Byte2 | Byte1 | Byte0 | |
| CDW0 | Reserved | | | | |
| CDW1 | | | | | |
| CDW2 | Reserved | | SQHD | | |
| CDW3 | Status | | CID | | |

FIG. 2B

| SQE | Byte3 | Byte2 | Byte1 | Byte0 |
|---|---|---|---|---|
| CDW0-9 | Command header ||||
| CDW10 | Reserved ||| ATTRIB |
| CDW11 | OFFSET ||||
| CDW12 | Reserved ||||
| CDW13 | ||||
| CDW14 | ||||
| CDW15 | ||||
| CQE | Byte3 | Byte2 | Byte1 | Byte0 |
| CDW0 | Command Specific DWORDS (PMR/CMB DWORDS) ||||
| CDW1 | ||||
| CDW2 | Reserved || SQHD ||
| CDW3 | Status || CID ||

FIG. 2C

| SQE | Byte3 | Byte2 | Byte1 | Byte0 |
|---|---|---|---|---|
| CDW0-5 | Command header ||||
| CDW6-9 | DPTR |||| ~129 |
| CDW10 | Reserved | Reserved | | ATTRIB | ~121, ~123 |
| CDW11-12 | OFFSET |||| ~125 |
| CDW13-15 | Reserved ||||

| CQE | Byte3 | Byte2 | Byte1 | Byte0 |
|---|---|---|---|---|
| CDW0 | Reserved ||||
| CDW1 | Reserved ||||
| CDW2 | Reserved || SQHD ||
| CDW3 | Status || CID ||

FIG. 2D

| SQE | Byte3 | Byte2 | Byte1 | Byte0 |
|---|---|---|---|---|
| CDW0-9 | Command header ||||
| CDW10 | Reserved ||| ATTRIB |
| CDW11 | OFFSET ||||
| CDW12 | VALUE ||||
| CDW13 | ^ ||||
| CDW14 | Reserved ||||
| CDW15 | ^ ||||
| CQE | Byte3 | Byte2 | Byte1 | Byte0 |
| CDW0 | Reserved ||||
| CDW1 | ^ ||||
| CDW2 | Reserved || SQHD ||
| CDW3 | Status || CID ||

FIG. 2E

| SQE | Byte3 | Byte2 | Byte1 | Byte0 |
|---|---|---|---|---|
| CDW0-5 | Command header ||||
| CDW6-9 | DPTR |||| ~129 |
| CDW10 | Reserved | Reserved | | ATTRIB |
| CDW11-12 | OFFSET |||| ~125 |
| CDW13-15 | Reserved ||||

121
123

| CQE | Byte3 | Byte2 | Byte1 | Byte0 |
|---|---|---|---|---|
| CDW0 | Reserved ||||
| CDW1 | |||||
| CDW2 | Reserved || SQHD ||
| CDW3 | Status || CID ||

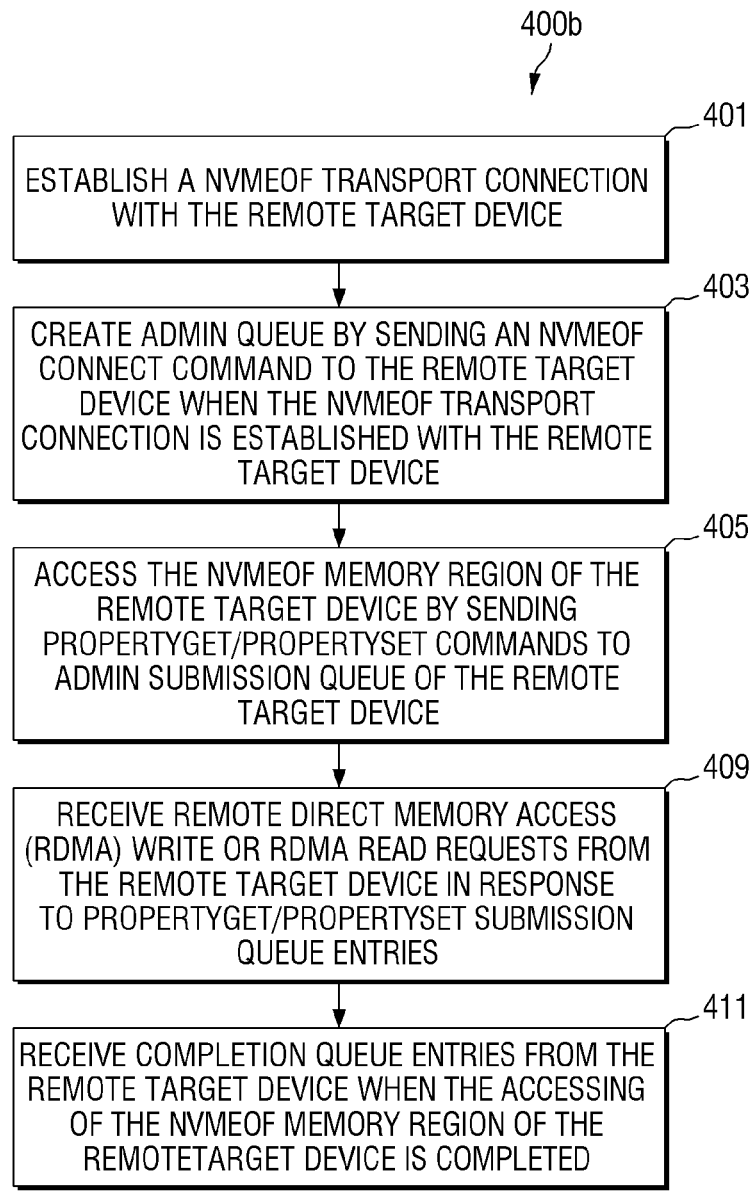

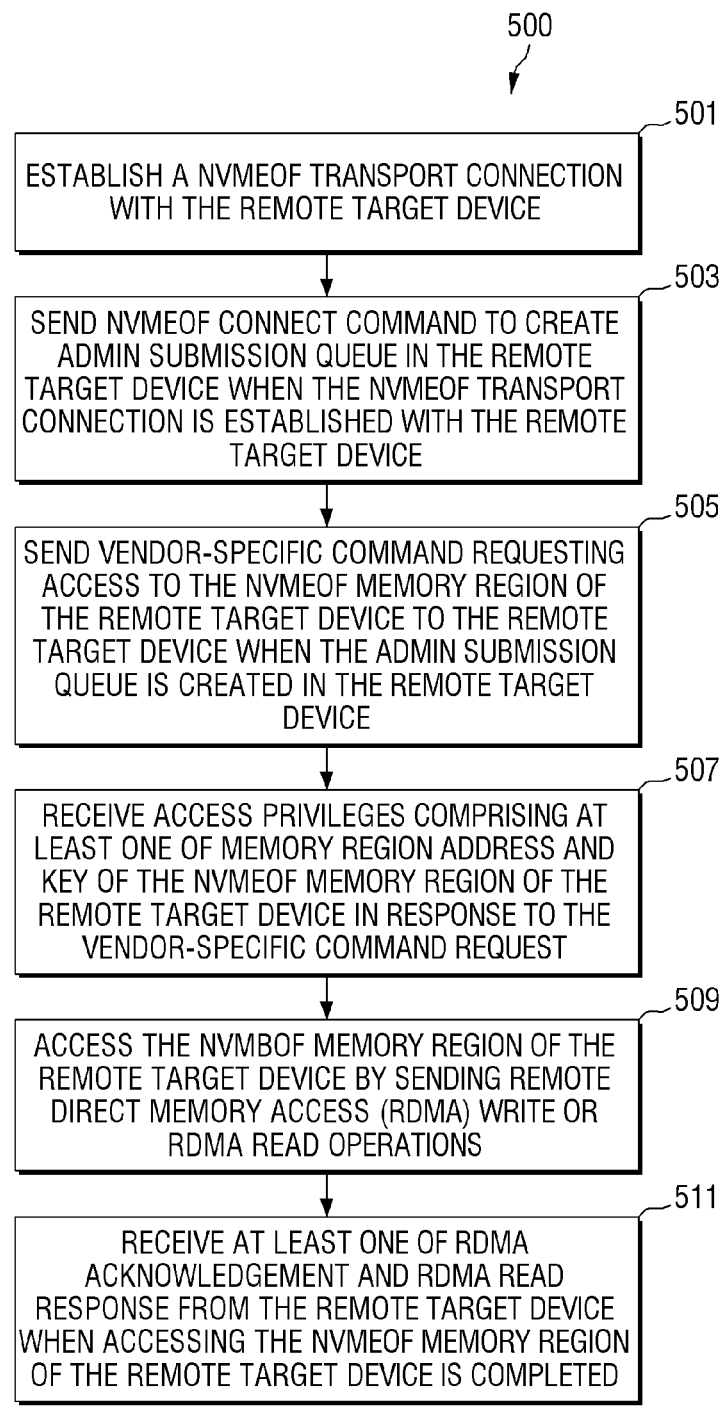

METHOD OF ACCESSING NVMEOF MEMORY REGION OF A REMOTE TARGET DEVICE BY A HOST CPU

CROSS-REFERENCE TO RELATED APPLICATIONS this application claims priority under 35 U.S.C. § 119 to Indian Patent Application No. 202141037370 filed on Aug. 17, 2021, the disclosure of which is incorporated by reference herein in its entirety.

TECHNICAL FIELD

Embodiments of the present invention relate to the field of data storage, and more particularly, to a method of accessing a Non-Volatile Memory express over Fabrics (NVMeoF) memory region of a remote target device by a host Central Processing Unit (CPU).

DISCUSSION OF RELATED ART

Traditionally, host Central Processing Units (CPU) can use their attached Non-Volatile Memory express (NVMe) device's memory, such as a Controller Memory Buffer (CMB) or a Persistent Memory Region (PMR), for performing its internal operations. To achieve this action, the host CPUs may use Peripheral Component Interconnect express (PCIe) Base Address Register (BAR)-based addressing to access the CMB or PMR.

SUMMARY

In an embodiment, a method of accessing a Non-Volatile Memory express over Fabrics (NVMeoF) memory region of a remote target device by a host CPU includes establishing a NVMeoF transport connection with the remote target device and creating an admin queue by sending a NVMeoF connect command to the remote target device when the NVMeoF transport connection is established with the remote target device. The method further includes accessing the NVMeoF memory region of the remote target device by sending PropertyGet/PropertySet commands to an admin submission queue of the remote target device. The method further includes performing one of receiving (a) PropertyGet/PropertySet completion queue entries from the remote target device when accessing the NVMeoF memory region of the remote target device is completed, or (b) Remote Direct Memory Access (RDMA) write or RDMA read requests from the remote target device in response to PropertyGet/PropertySet submission queue entries, and receiving completion queue entries from the remote target device when the accessing of the NVMeoF memory region of the remote target device is completed.

In an embodiment, a method of accessing a NVMeoF memory region of a remote target device by a host CPU includes establishing a NVMeoF transport connection with the remote target device and sending a NVMeoF connect command that creates an admin submission queue in the remote target device when the NVMeoF transport connection is established with the remote target device. The method includes sending a vendor-specific command that requests access to the NVMeoF memory region of the remote target device to the remote target device when the admin submission queue is created in the remote target device. The method further includes receiving an access privilege including at least one of a memory region address and a key of the NVMeoF memory region of the remote target device in response to the vendor-specific command and accessing the NVMeoF memory region of the remote target device by sending RDMA write or RDMA read operations by the host CPU. The method further includes receiving at least one of a RDMA acknowledgement and a RDMA read response from the remote target device when accessing the NVMeoF memory region of the remote target device is completed.

In an embodiment, a host CPU that accesses a NVMeoF memory region of a remote target device includes a processor and a memory communicatively coupled to the processor. The memory stores processor-executable instructions, which on execution, cause the processor to establish a NVMeoF transport connection with the remote target device. The host CPU is configured to create an admin queue by sending a NVMeoF connect command to the remote target device when the NVMeoF transport connection is established with the remote target device and access the NVMeoF memory region of the remote target device by sending PropertyGet/PropertySet commands to an admin submission queue of the remote target device. The host CPU is further configured to perform one of receiving (1) PropertyGet/PropertySet completion queue entries from the remote target device when accessing the NVMeoF memory region of the remote target device is completed, or (b) RDMA write or RDMA read requests from the remote target device in response to PropertyGet/PropertySet submission queue entries, and receiving completion queue entries from the remote target device when the accessing of the NVMeoF memory region of the remote target device is completed.

BRIEF DESCRIPTION OF THE DRAWINGS

The above and other features of the present invention will become more apparent by describing in detail embodiments thereof with reference to the accompanying drawings, in which:

FIGS. 1B and 1C show a PropertyGet command format according to the NVMeoF technical specification and according to an embodiment of the present disclosure, respectively.

FIGS. 1D and 1E show a PropertySet command format according to the NVMeoF technical specification and according to an embodiment of the present disclosure, respectively.

FIGS. 2B and 2C show a PropertyGet command format according to the NVMeoF technical specification and according to an embodiment of the present disclosure, respectively.

FIGS. 2D and 2E show a PropertySet command format according to the NVMeoF technical specification and according to an embodiment of the present disclosure, respectively.

FIG. 4B illustrates a flowchart showing a method of accessing a NVMeoF memory region of a remote target device by a host CPU in accordance with an embodiment of the present disclosure.

FIG. 5 illustrates a flowchart showing a method of accessing a NVMeoF memory region of a remote target device by a host CPU in accordance with an embodiment of the present disclosure.

Figure 1A:
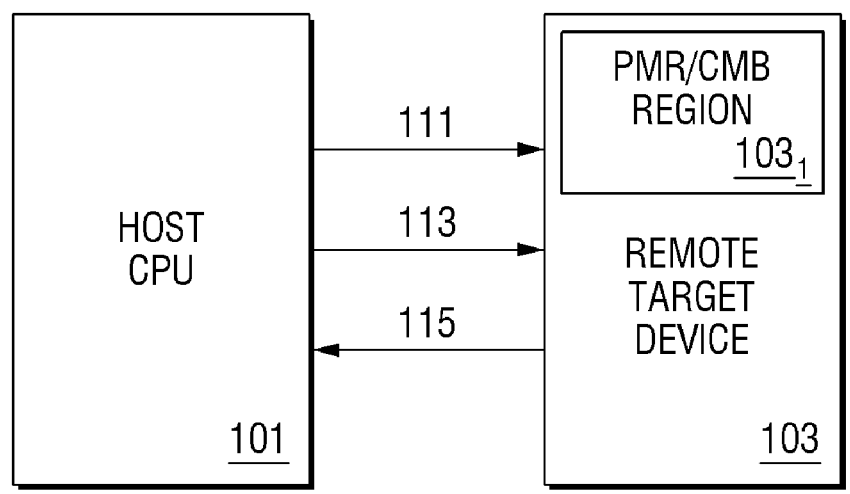
FIG. 1A shows a diagram illustrating an example of an operation for accessing a Non-Volatile Memory express over Fabrics (NVMeoF) memory region of a remote target device by a host Central Processing Unit (CPU) in accordance with an embodiment of the present disclosure.

It should be appreciated by those skilled in the art that any block diagrams herein represent conceptual views of illustrative systems embodying the principles of embodiments of the present disclosure. Similarly, it will be appreciated that any flowcharts, flow diagrams, state transition diagrams, pseudo code, and the like represent various processes which may be substantially represented in computer readable medium and executed by a computer or processor, whether such computer or processor is explicitly shown.

DETAILED DESCRIPTION

Embodiments of the present invention will be described more fully hereinafter with reference to the accompanying drawings. Like reference numerals may refer to like elements throughout the accompanying drawings.

It should be understood that descriptions of features or aspects within each embodiment should typically be considered as available for other similar features or aspects in other embodiments, unless the context clearly indicates otherwise.

As used herein, the singular forms "a", "an" and "the" are intended to include the plural forms as well, unless the context clearly indicates otherwise.

The terms "comprises", "comprising", or any other variations thereof, are intended to cover a non-exclusive inclusion, such that a setup, device or method that comprises a list of components or steps does not necessarily include only those components or steps, but may also include other components or steps not expressly listed or inherent to such setup or device or method. In other words, one or more elements in a system or apparatus proceeded by "comprises . . . a" does not, without more constraints, preclude the existence of other elements or additional elements in the system or method.

FIG. 1A shows a diagram illustrating an example of an operation for accessing a Non-Volatile Memory express over Fabrics (NVMeoF) memory region of a remote target device by a host Central Processing Unit (CPU) in accordance with an embodiment of the present disclosure.

As shown in FIG. 1A, a host CPU 101 is in communication with a remote target device 103. In an embodiment, a plurality of host CPUs 101 and the remote target device 103 may be included. The host CPU 101 may be, for example, a server, and the remote target device 103 may be, for example, a storage, such as a NVMeoF Solid State Drive (SSD) storage.

The remote target device 103 may include a memory region, which may also be referred to as a NVMeoF memory region $103_1$. The NVMeoF memory region $103_1$ of the remote target device 103 may include at least one of a Controller Memory Buffer (CMB) and a Persistent Memory Region (PMR). Hereinafter, an operation/method of accessing the NVMeoF memory region $103_1$ of the remote target device 103 by the host CPU 101 will be described.

In an embodiment, the host CPU 101 seeking to access the NVMeoF memory region $103_1$ of the remote target device 103 establishes a NVMeoF transport connection with the remote target device 103. When the NVMeoF transport connection is established with the remote target device 103, at operation 111, the host CPU 101 creates an admin queue by sending a NVMeoF connect command to the remote target device 103. Thereafter, at operation 113, the host CPU 101 accesses the NVMeoF memory region $103_1$ of the remote target device 103 by sending PropertyGet/PropertySet commands to an admin submission queue of the remote target device 103. The PropertyGet/PropertySet commands may include at least one of a "PropertyGet command" to read from the NVMeoF memory region $103_1$ of the remote target device 103 and a "Property Set command" to write to the NVMeoF memory region $103_1$ of the remote target device 103.

FIGS. 1B and 1C show a PropertyGet command format according to the NVMeoF technical specification and according to an embodiment of the present disclosure, respectively.

In accordance with an embodiment of the present disclosure, the format of the PropertyGet command, for example, Submission Queue Entries (SQE) of the PropertyGet command, is modified as shown in FIG. 1C. FIG. 1B shows a representation of a PropertyGet command format according to the NVMeoF technical specification, whereas FIG. 1C shows a PropertyGet command format according to an embodiment of the present disclosure.

In comparison to the SQE of the PropertyGet command format in FIG. 1B, in the SQE of the PropertyGet command format shown in FIG. 1C, a single bit for the PMR, also referred to as PMR bit 121, is added. The PMR bit 121 is added to Bit 1 of Byte 1 of CDW10. Herein, the abbreviation CDW refers to a Command Dword. When the host CPU 101 wants to access the PMR region of the NVMeoF memory region $103_1$ of the remote target device 103, the host CPU 101 adds/enables (sets to '1') the PMR bit 121, which is sent in the PropertyGet command to the admin submission queue of the remote target device 103. When the host CPU 101 does not want to access the PMR region of the NVMeoF memory region $103_1$ of the remote target device 103, the host CPU 101 removes/disables (sets to '0') the PMR bit 121.

Analogously, in comparison to the SQE of the PropertyGet command format in FIG. 1B, in the SQE of the PropertyGet command format shown in FIG. 1C, a single bit for the CMB, also referred to as CMB bit 123, is added. The CMB bit 123 is added to Bit 0 of Byte 1 of CDW10. When the host CPU 101 wants to access the CMB region of the NVMeoF memory region $103_1$ of the remote target device 103, the host CPU 101 adds/enables (set to '1') the CMB bit 123, which is sent in the PropertyGet command to the admin submission queue of the remote target device 103. When the host CPU 101 does not want to access the CMB region of the NVMeoF memory region $103_1$ of the remote target device 103, the host CPU 101 removes/disables (sets to '0') the CMB bit 123. The OFFSET field 125 in the PropertyGet command represents the address of the PMR/CMB memory region required by the host 101. The OFFSET field 125 in the SQE of the PropertyGet command format is increased in size, which includes CDW11 and CDW12 (shown in FIG. 1C) as compared to the OFFSET field, which includes only CDW11 (shown in FIG. 1B). With respect to Completion Queue Entries (CQE) of the PropertyGet command format shown in FIG. 1B and FIG. 1C, there is no change in the CQE, e.g., all of the fields are the same.

FIG. 1D shows the PropertySet command format according to the NVMeoF technical specification, and FIG. 1E shows the PropertySet command format according to an embodiment of the present disclosure.

In accordance with an embodiment of the present disclosure, the format of the PropertySet command, for example, the SQE of the PropertySet command, is modified as shown in FIG. 1E. FIG. 1d shows a PropertySet command format as per the NVMeoF technical specification, whereas FIG. 1e shows a PropertySet command format as per an embodiment of the present disclosure. In comparison to the SQE of the PropertySet command format in FIG. 1D, in the SQE of the PropertySet command format shown in FIG. 1E, a single bit for the PMR, also referred to as PMR bit 121, is added. The PMR bit 121 is added to Bit 1 of Byte 1 of CDW10. When the host CPU 101 wants to access the PMR region of the NVMeoF memory region $103_1$ of the remote target device 103, the host CPU 101 adds/enables (sets to '1') the PMR bit 121, which is sent in the PropertySet command to the admin submission queue of the remote target device 103. When the host CPU 101 does not want to access the PMR region of the NVMeoF memory region $103_1$ of the remote target device 103, the host CPU 101 removes/disables (sets to '0') the PMR bit 121.

Analogously, in comparison to the SQE of the PropertySet command format in FIG. 1D, in the SQE of the PropertySet command format shown in FIG. 1E, a single bit for the CMB, also referred to as CMB bit 123, is added. The CMB bit 123 is added to Bit 0 of Byte 1 of CDW10. When the host CPU 101 wants to access the CMB region of the NVMeoF memory region $103_1$ of the remote target device 103, the host CPU 101 adds/enables (sets to '1') the CMB bit 123, which is sent in the PropertySet command to the admin submission queue of the remote target device 103. When the host CPU 101 does not want to access the CMB region of the NVMeoF memory region $103_1$ of the remote target device 103, the host CPU 101 removes/disables (sets to '0') the CMB bit 123. The OFFSET field 125 in the PropertySet command represents the address of the PMR/CMB memory region required by the host 101. The OFFSET field 125 in the SQE of the PropertySet command format is increased in size, which includes CDW11 and CDW12 (shown in FIG. 1E) as compared to the OFFSET field which includes only CDW11 (shown in FIG. 1D). Due to an increase in the OFFSET field 125 in the SQE of the PropertySet command format, a VALUE field 127 is moved to CDW13-14 (shown in FIG. 1E) from CDW12-13 (shown in FIG. 1D). The VALUE field 127 represents the data to be written to the PMR/CMB region of the remote target device 103. With respect to the CQE of the PropertySet command format shown in FIG. 1D and FIG. 1E, there is no change in the CQE, e.g., all of the fields are the same.

At this stage, when accessing the NVMeoF memory region $103_1$ of the remote target device 103 is completed, at operation 115 (see FIG. 1A), the host CPU 101 receives one of PropertyGet/PropertySet completion queue entries from the remote target device 103.

The method according to an embodiment of the present disclosure described above includes a small amount of changes to the NVMeoF technical specification, and as a result, can be standardized.

Figure 2A:
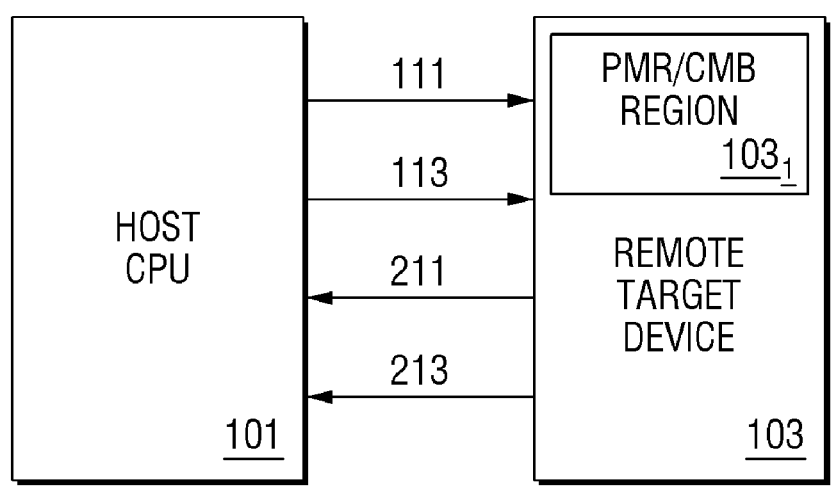
FIG. 2A shows a diagram illustrating an example of an operation for accessing the NVMeoF memory region of a remote target device by a host CPU in accordance with an embodiment of the present disclosure.

FIG. 2A shows a diagram illustrating an example of an operation for accessing the NVMeoF memory region of a remote target device by a host CPU in accordance with an embodiment of the present disclosure.

As shown in FIG. 2A, a host CPU 101 is in communication with a remote target device 103. In an embodiment, a plurality of host CPUs 101 and the remote target device 103 may be included. The host CPU 101 may be, for example, a server, and the remote target device 103 may be, for example, a storage, such as a NVMeoF SSD storage.

The remote target device 103 may include a memory region, which may also be referred to as a NVMeoF memory region $103_1$. The NVMeoF memory region $103_1$ of the remote target device 103 may include at least one of the CMB and the PMR. Hereinafter, the operation/method of accessing NVMeoF memory region $103_1$ of the remote target device 103 by the host CPU 101 according to an embodiment of the present disclosure will be described.

The host CPU 101 seeking to access the NVMeoF memory region $103_1$ of the remote target device 103 establishes a NVMeoF transport connection with the remote target device 103. When the NVMeoF transport connection is established with the remote target device 103, at operation 111, the host CPU 101 creates an admin queue by sending a NVMeoF connect command to the remote target device 103. Thereafter, at operation 113, the host CPU 101 accesses the NVMeoF memory region $103_1$ of the remote target device 103 by sending PropertyGet/PropertySet commands to an admin submission queue of the remote target device 103. The PropertyGet/PropertySet commands may include at least one of a "PropertyGet command" to read from the NVMeoF memory region $103_1$ of the remote target device 103 and a "PropertySet command" to write to the NVMeoF memory region $103_1$ of the remote target device 103.

FIGS. 2B and 2C show a PropertyGet command format according to the NVMeoF technical specification and according to an embodiment of the present disclosure, respectively.

In accordance with an embodiment of the present disclosure, the format of the PropertyGet command, for example, the SQE of the PropertyGet command, is modified as shown in FIG. 2C. FIG. 2B shows a PropertyGet command format according to the NVMeoF technical specification, whereas FIG. 2C shows a PropertyGet command format according to an embodiment of the present disclosure. In comparison to the SQE of the PropertyGet command format in FIG. 2B, in the SQE of the PropertyGet command format shown in FIG. 2C, a single bit for the PMR, also referred to as PMR bit 121, is added. The PMR bit 121 is added to Bit 1 of Byte 1 of CDW10. When the host CPU 101 wants to access the PMR region of the NVMeoF memory region $103_1$ of the remote target device 103, the host CPU 101 adds/enables (sets to '1') the PMR bit 121, which is sent in the PropertyGet command to an admin submission queue of the remote target device 103. When the host CPU 101 does not want to access the PMR region of the NVMeoF memory region $103_1$ of the remote target device 103, the host CPU 101 removes/disables (sets to '0') the PMR bit 121.

Analogously, in comparison to the SQE of the PropertyGet command format in FIG. 2B, in the SQE of the PropertyGet command format shown in FIG. 2C, a single bit for the CMB, also referred to as CMB bit 123, is added. The CMB bit 123 is added to Bit 0 of Byte 1 of CDW10. When the host CPU 101 wants to access the CMB region of the NVMeoF memory region $103_1$ of the remote target device 103, the host CPU 101 adds/enables (sets to '1') the CMB bit 123, which is sent in the PropertyGet command to the admin submission queue of the remote target device 103. When the host CPU 101 does not want to access the CMB region of the NVMeoF memory region $103_1$ of the remote target device 103, the host CPU 101 removes/disables (sets to '0') the CMB bit 123. The OFFSET field 125 in the PropertyGet command represents the address of the PMR/

CMB memory region required by the host 101. The OFFSET field 125 in the SQE of the PropertyGet command format is increased in size, which includes CDW11 and CDW12 (shown in FIG. 2C) as compared to the OFFSET field which includes only CDW11 (shown in FIG. 2B). Additionally, a Data Pointer (DPTR) field 129 is added in the "PropertyGet/PropertySet command" by the host CPU 101. The DPTR field 129 describes the host memory address and length by using, for example, a Keyed Scatter Gather List (SGL). For example, in comparison to the SQE of the PropertyGet command format in FIG. 2B, in SQE of the PropertyGet command format shown in FIG. 2C, the DPTR field 129 is added/included in CDW6 to CDW9. With respect to the CQE of the PropertyGet command format described in an embodiment as shown in FIG. 2C, CDW0 and CDW1 are reserved, unlike the PropertyGet command format described in the NVMeoF technical specification as shown in FIG. 2B.

In accordance with an embodiment of the present disclosure, the format of the PropertySet command, for example, the SQE of the PropertySet command, is described below with reference to FIG. 2D and FIG. 2E.

FIG. 2D shows a PropertySet command format according to the NVMeoF technical specification, whereas FIG. 2E shows a PropertySet command format according to an embodiment of the present disclosure.

In comparison to the SQE of the PropertySet command format in FIG. 2D, in the SQE of the PropertySet command format shown in FIG. 2E, a single bit for the PMR, also referred to as PMR bit 121, is added. The PMR bit 121 is added to Bit 1 of Byte 1 of CDW10. When the host CPU 101 wants to access the PMR region of the NVMeoF memory region $103_1$ of the remote target device 103, the host CPU 101 adds/enables (sets to '1') the PMR bit 121, which is sent in the PropertySet command to the admin submission queue of the remote target device 103. When the host CPU 101 does not want to access the PMR region of the NVMeoF memory region $103_1$ of the remote target device 103, the host CPU 101 removes/disables (sets to '0') the PMR bit 121.

Analogously, in comparison to the SQE of the PropertySet command format in FIG. 2D, in the SQE of the PropertySet command format shown in FIG. 2E, a single bit for the CMB, also referred to as CMB bit 123, is added. The CMB bit 123 is added to Bit 0 of Byte 1 of CDW10. When the host CPU 101 wants to access the CMB region of the NVMeoF memory region $103_1$ of the remote target device 103, the host CPU 101 adds/enables (sets to '1') the CMB bit 123, which is sent in the PropertySet command to the admin submission queue of the remote target device 103. When the host CPU 101 does not want to access the CMB region of the NVMeoF memory region $103_1$ of the remote target device 103, the host CPU 101 removes/disables (sets to '0') the CMB bit 123. The OFFSET field in the PropertySet command represents the address of the PMR/CMB memory region required by the host 101. The OFFSET field 125 in the SQE of the PropertySet command format is increased in size, which includes CDW11 and CDW12 (shown in FIG. 2E) as compared to the OFFSET field which includes only CDW11 (shown in FIG. 2D). With respect to the CQE of the PropertySet command format shown in FIG. 2D and FIG. 2E, there is no change in the CQE, e.g., all of the fields are the same.

At this stage, e.g., at operation 211, the remote target device 103 sends a Remote Direct Memory Access (RDMA) write or read requests to the host CPU 101 in response to PropertyGet/PropertySet submission queue entries received in the admin submission queue. Using the RDMA write or RDMA read requests, the host CPU 101 accesses the NVMeoF memory region $103_1$ of the remote target device 103. Thereafter, at operation 213, the host CPU 101 receives completion queue entries from the remote target device 103 when the accessing of the NVMeoF memory region $103_1$ of the remote target device 103 is completed.

The method according to an embodiment of the present disclosure described above with reference to FIGS. 2A to 2E includes a moderate amount of changes to the NVMeoF technical specification, which may result in faster accessing of the NVMeoF memory region $103_1$ in the case of accessing a PMR/CMB of the remote target device 103 having a larger size as compared to an embodiment of the present disclosure described above with reference to FIGS. 1A to 1E.

Figure 3:
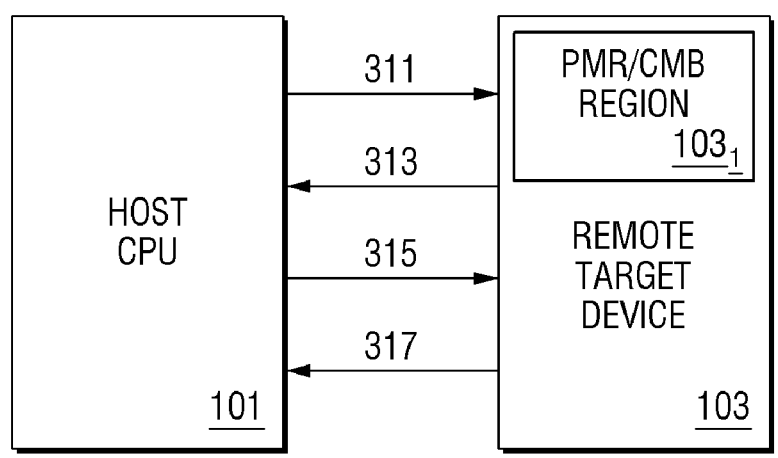
FIG. 3 shows a diagram illustrating an example of an operation for accessing the NVMeoF memory region of a remote target device by a host CPU in accordance with an embodiment of the present disclosure.

FIG. 3 shows a diagram illustrating an example of an operation for accessing the NVMeoF memory region of a remote target device by a host CPU in accordance with an embodiment of the present disclosure.

As shown in FIG. 3, a host CPU 101 is in communication with a remote target device 103. In an embodiment, a plurality of host CPUs 101 and the remote target device 103 may be included. The host CPU 101 may be, for example, a server, and the remote target device 103 may be, for example, a storage, such as a NVMeoF SSD storage.

The remote target device 103 may include a memory region, which may also be referred to as a NVMeoF memory region $103_1$. The NVMeoF memory region $103_1$ of the remote target device 103 may include at least one of a CMB and a PMR.

Hereinafter, the operation/method of accessing NVMeoF memory region $103_1$ of the remote target device 103 by the host CPU 101 according to an embodiment of the present disclosure will be described.

In an embodiment, the host CPU 101 seeking to access the NVMeoF memory region $103_1$ of the remote target device 103 establishes a NVMeoF transport connection and sends a NVMeoF connect command to create an admin submission queue in the remote target device 103. When the admin submission queue is created in the remote target device 103, at operation 311, the host CPU 101 sends a vendor-specific command requesting access to the NVMeoF memory region $103_1$ of the remote target device 103 to the remote target device 103. The vendor-specific command may refer to, for example, a command that is implemented by (e.g., is specific to) vendors in a non-standard specific use case. In response to the vendor-specific command request, at operation 313, the host CPU 101 receives access privileges including at least one of a memory region address and key of the NVMeoF memory region $103_1$ of the remote target device 103. At operation 315, using the at least one of the memory region address and the key of the NVMeoF memory region $103_1$, the host CPU 101 accesses the NVMeoF memory region $103_1$ of the remote target device 103 by sending RDMA write or RDMA read operations. When accessing the NVMeoF memory region $103_1$ of the remote target device 103 is completed, at operation 317, the host CPU 101 receives at least one of a RDMA acknowledgement and RDMA read response from the remote target device 103.

The method according to an embodiment of the present disclosure described above with reference to FIG. 3 uses vendor-specific commands, and as a result, this approach may increase the speed of accessing the NVMeoF memory region $103_1$ of the remote target device 103 compared to embodiments of the present disclosure according to FIGS. 1A to 1E and 2A to 2E.

Figure 4A:
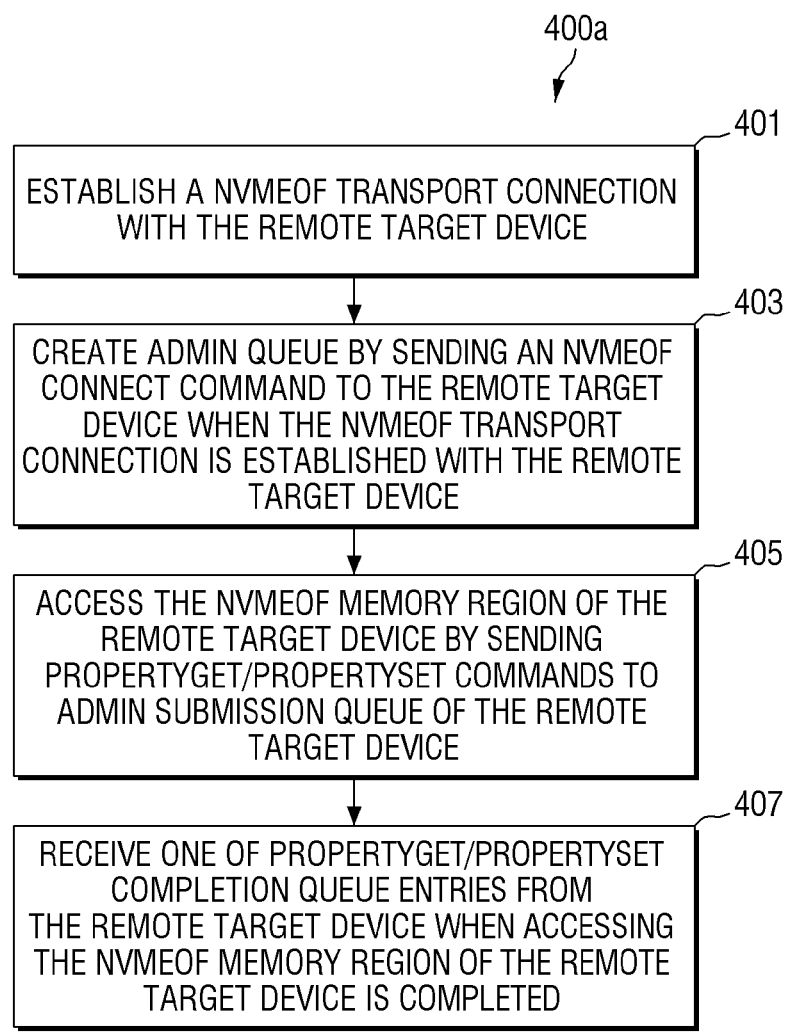
FIG. 4A illustrates a flowchart showing a method of accessing a NVMeoF memory region of a remote target device by a host CPU in accordance with an embodiment of the present disclosure.

FIG. 4A illustrates a flowchart showing a method of accessing a NVMeoF memory region of a remote target device by a host CPU in accordance with an embodiment of the present disclosure.

As illustrated in FIG. 4A, the method 400a includes blocks for accessing a NVMeoF memory region of a remote target device by a host CPU in accordance with an embodiment of the present disclosure according to FIGS. 1A to 1E. The method 400a may be described in the general context of computer executable instructions. Generally, computer executable instructions can include routines, programs, objects, components, data structures, procedures, units, and functions, which perform particular functions or implement particular abstract data types.

The order in which the method 400a is described is not intended to be construed as a limitation, and any number of the described method blocks can be combined in any order to implement the method. Additionally, individual blocks may be deleted from the method 400a according to some embodiments without departing from the scope of the subject matter described herein. Furthermore, the method can be implemented in any suitable hardware, software, firmware, or combination thereof.

At block 401, the host CPU 101 may establish a NVMeoF transport connection with the remote target device 103.

At block 403, the host CPU 101 may create an admin queue by sending a NVMeoF connect command to the remote target device 103 when the NVMeoF transport connection is established with the remote target device 103.

At block 405, the host CPU 101 may access the NVMeoF memory region $103_1$ of the remote target device by sending PropertyGet/PropertySet commands to an admin submission queue of the remote target device 103. The NVMeoF memory region $103_1$ of the remote target device 103 may include at least one of a CMB and a PMR.

At block 407, the host CPU 101 may receive one of PropertyGet/PropertySet completion queue entries from the remote target device 103 when the accessing of the NVMeoF memory region $103_1$ of the remote target device 103 is completed.

FIG. 4B illustrates a flowchart showing a method of accessing a NVMeoF memory region of a remote target device by a host CPU in accordance with an embodiment of the present disclosure.

As illustrated in FIG. 4B, the method 400b includes blocks for accessing a NVMeoF memory region of a remote target device by a host CPU in accordance with an embodiment of the present disclosure according to FIGS. 2A to 2E. The method 400b may be described in the general context of computer executable instructions. Generally, computer executable instructions can include routines, programs, objects, components, data structures, procedures, units, and functions, which perform particular functions or implement particular abstract data types.

The order in which the method 400b is described is not intended to be construed as a limitation, and any number of the described method blocks can be combined in any order to implement the method. Additionally, individual blocks may be deleted from the method 400b without departing from the scope of the subject matter described herein. Furthermore, the method can be implemented in any suitable hardware, software, firmware, or combination thereof.

At block 401, the host CPU 101 may establish a NVMeoF transport connection with the remote target device 103.

At block 403, the host CPU 101 may create an admin queue by sending a NVMeoF connect command to the remote target device 103 when the NVMeoF transport connection is established with the remote target device 103.

At block 405, the host CPU 101 may access the NVMeoF memory region $103_1$ of the remote target device by sending PropertyGet/PropertySet commands to an admin submission queue of the remote target device 103. The NVMeoF memory region $103_1$ of the remote target device 103 may include at least one of a CMB and a PMR.

At block 409, the host CPU 101 may receive RDMA write or RDMA read requests from the remote target device 103 in response to PropertyGet/PropertySet submission queue entries.

At block 411, the host CPU 101 may receive completion queue entries from the remote target device 103 when the accessing of the NVMeoF memory region $103_1$ of the remote target device 103 is completed.

FIG. 5 illustrates a flowchart showing a method of accessing a NVMeoF memory region of a remote target device by a host CPU in accordance with an embodiment of the present disclosure.

As illustrated in FIG. 5, the method 500 includes blocks for accessing a NVMeoF memory region of a remote target device by a host CPU in accordance with an embodiment of the present disclosure according to FIG. 3. The method 500 may be described in the general context of computer executable instructions. Generally, computer executable instructions can include routines, programs, objects, components, data structures, procedures, units, and functions, which perform particular functions or implement particular abstract data types.

The order in which the method 500 is described is not intended to be construed as a limitation, and any number of the described method blocks can be combined in any order to implement the method. Additionally, individual blocks may be deleted from the method 500 without departing from the scope of the subject matter described herein. Furthermore, the method can be implemented in any suitable hardware, software, firmware, or combination thereof.

At block 501, the host CPU 101 may establish a NVMeoF transport connection with the remote target device 103.

At block 503, the host CPU 101 may send a NVMeoF connect command to create an admin submission queue in the remote target device 103 when the NVMeoF transport connection is established with the remote target device 103.

At block 505, the host CPU 101 may send a vendor-specific command requesting access to the NVMeoF memory region $103_1$ of the remote target device 103 to the remote target device 103 when the admin submission queue is created in the remote target device 103.

At block 507, the host CPU 101 may receive access privileges including at least one of a memory region address and a key of the NVMeoF memory region $103_1$ of the remote target device 103 in response to the vendor-specific command request.

At block 509, the host CPU 101 may access the NVMeoF memory region $103_1$ of the remote target device 103 by sending RDMA write or RDMA read operations.

At block 511, the host CPU 101 may receive at least one of a RDMA acknowledgement and RDMA read response from the remote target device 103 when accessing the NVMeoF memory region $103_1$ of the remote target device 103 is completed.

Traditionally, accessing a NVMeoF memory region such as a CMB or a PMR is limited to a NVMe Peripheral Component Interconnect express (PCIe) based transport only. However, embodiments of the present invention allow host CPUs to access a NVMeoF memory region such as a CMB or a PMR of a remote target device over a fast, scalable and shareable NVMeoF based transport.

Although embodiments of the present disclosure are described with reference to RDMA based transports, the present disclosure is not limited thereto. For example, according to embodiments of the present disclosure, methods can be applicable to other NVMeoF transports such as NVMe-TCP, NVMe-FC, etc. In addition, although embodiments of the present disclosure are described with reference to PMR/CMB NVMeoF memory regions, the present disclosure is not limited thereto. For example, according to embodiments of the present disclosure, methods can be applicable to other types of NVMeoF memory regions such as computational memory regions.

The described operations may be implemented as a method, system, or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor may be at least one of a microprocessor and a processor capable of processing and executing the queries. A non-transitory computer readable medium may include media such as, for example, magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media include all computer-readable media except transitory computer-readable media. The code implementing the described operations may further be implemented in hardware logic (e.g., an integrated circuit chip, Programmable Gate Array (PGA), Application Specific Integrated Circuit (ASIC), etc.).

The terms "including", "comprising", "having" and variations thereof mean "including but not limited to", unless expressly specified otherwise.

The terms "a", "an" and "the" may mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it will be readily apparent that more than one device/article (whether they cooperate) may be used in place of a single device/article. Similarly, where more than one device or article is described herein (whether they cooperate), it will be readily apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIGS. 4A, 4B and 5 show certain events occurring in a certain order. In alternative embodiments, certain operations may be performed in a different order, modified or removed. Moreover, operations may be added to the above-described logic and still conform to the described embodiments. Further, operations described herein may occur sequentially or certain operations may be processed in parallel. Further still, operations may be performed by a single processing unit or by distributed processing units.

While the present invention has been particularly shown and described with reference to embodiments thereof, it will be understood by those of ordinary skill in the art that various changes in form and detail may be made therein without departing from the spirit and scope of the present invention as defined by the following claims.

What is claimed is:

1. A method of accessing a Non-Volatile Memory express over Fabrics (NVMeoF) memory region of a remote target device by a host Central Processing Unit (CPU), the method comprising:
establishing, by the host CPU, a NVMeoF transport connection with the remote target device;
creating, by the host CPU, an admin queue by sending a NVMeoF connect command to the remote target device when the NVMeoF transport connection is established with the remote target device;
accessing, by the host CPU, the NVMeoF memory region of the remote target device by sending PropertyGet/PropertySet commands to an admin submission queue of the remote target device,
wherein the NVMeoF memory region of the remote target device comprises at least one of a Controller Memory Buffer (CMB) region and a Persistent Memory Region (PMR) region,
wherein a PMR bit in the PropertyGet/PropertySet submission queue entries is enabled by the host CPU when the host CPU wants to remotely access the PMR region of the NVMeoF memory region of the remote target device, and is disabled when the host CPU does not want to remotely access the PMR region of the NVMeoF memory region of the remote target device,
wherein a CMB bit in the PropertyGet/Property Set submission queue entries is enabled by the host CPU when the host CPU wants to remotely access the CMB region of the NVMeoF memory region of the remote target device, and is disabled when the host CPU does not want to remotely access the CMB region of the NVMeoF memory region of the remote target device,
wherein the host CPU remotely accesses the CMB region of the NVMeoF memory region of the remote target device when the CMB bit is enabled or remotely accesses the PMR region of the NVMeoF memory region of the remote target device when the PMR bit is enabled via a remote connection without accessing the CMB region or the PMR region of the NVMeoF memory region of the remote target device via a Peripheral Component Interconnect express (PCIe) connection;
performing one of (a) receiving, by the host CPU, PropertyGet/Property Set completion queue entries from the remote target device when accessing the NVMeOF memory region of the remote target device is completed, or (b) receiving, by the host CPU, Remote Direct Memory Access (RDMA) write or RDMA read requests from the remote target device in response to PropertyGet/PropertySet submission queue entries; and
receiving, by the host CPU, completion queue entries from the remote target device when the accessing of the NVMeOF memory region of the remote target device is completed.

2. The method of claim 1, wherein the PropertyGet/Property Set commands comprise at least one of a PropertyGet command that causes the NVMeOF memory region of the remote target device to be read from and a Property Set command that causes the NVMeoF memory region of the remote target device to be written to.

3. The method of claim 2, wherein a Data Pointer (DPTR) field is added to the PropertyGet/Property Set commands by the host CPU.

4. A method of accessing a Non-Volatile Memory express (NVMe) memory region of a remote target device by a host Central Processing Unit (CPU), the method comprising:
  establishing, by the host CPU, a NVMeoF transport connection with the remote target device;
  sending, by the host CPU, a NVMeoF connect command that creates an admin submission queue in the remote target device when the NVMeoF transport connection is established with the remote target device;
  sending, by the host CPU, a vendor-specific command that requests access to the NVMeoF memory region of the remote target device, by the host CPU, to the remote target device when the admin submission queue is created in the remote target device,
  wherein the NVMeoF memory region of the remote target device comprises at least one of a Controller Memory Buffer (CMB) region and a Persistent Memory Region (PMR) region,
  wherein a PMR bit in the admin submission queue is enabled by the host CPU when the host CPU wants to remotely access the PMR region of the NVMeoF memory region of the remote target device, and is disabled when the host CPU does not want to remotely access the PMR region of the NVMeoF memory region of the remote target device,
  wherein a CMB bit in the admin submission queue is enabled by the host CPU when the host CPU wants to remotely access the CMB region of the NVMeoF memory region of the remote target device, and is disabled when the host CPU does not want to remotely access the CMB region of the NVMeoF memory region of the remote target device;
  receiving, by the host CPU, an access privilege comprising at least one of a memory region address and a key of the NVMeOF memory region of the remote target device in response to the vendor-specific command;
  accessing, by the host CPU, the NVMeoF memory region of the remote target device by sending Remote Direct Memory Access (RDMA) write or RDMA read operations,
  wherein the host CPU remotely accesses the CMB region of the NVMeoF memory region of the remote target device when the CMB bit is enabled or remotely accesses the PMR region of the NVMeoF memory region of the remote target device when the PMR bit is enabled via a remote connection without accessing the CMB region or the PMR region of the NVMeoF memory region of the remote target device via a Peripheral Component Interconnect express (PCIe) connection; and
  receiving, by the host CPU, at least one of a RDMA acknowledgement and a RDMA read response from the remote target device when accessing the NVMeOF memory region of the remote target device is completed.

5. A host Central Processing Unit (CPU) that accesses a Non-Volatile Memory express over Fabrics (NVMeoF) memory region of a remote target device, the host CPU comprising:
  a processor; and
  a memory communicatively coupled to the processor, wherein the memory stores processor-executable instructions, which on execution, cause the processor to:
  establish a NVMeoF transport connection with the remote target device;
  create an admin queue by sending a NVMeoF connect command to the remote target device when the NVMeoF transport connection is established with the remote target device;
  access the NVMeoF memory region of the remote target device by sending PropertyGet/Property Set commands to an admin submission queue of the remote target device,
  wherein the NVMeOF memory region of the remote target device comprises at least one of a Controller Memory Buffer (CMB) region and a Persistent Memory Region (PMR) region,
  wherein a PMR bit in the PropertyGet/Property Set submission queue entries is enabled by the host CPU when the host CPU wants to remotely access the PMR region of the NVMeoF memory region of the remote target device, and is disabled when the host CPU does not want to remotely access the PMR region of the NVMeoF memory region of the remote target device,
  wherein a CMB bit in the PropertyGet/PropertySet submission queue entries is enabled by the host CPU when the host CPU wants to remotely access the CMB region of the NVMeoF memory region of the remote target device, and is disabled when the host CPU does not want to remotely access the CMB region of the NVMeoF memory region of the remote target device,
  wherein the host CPU remotely accesses the CMB region of the NVMeoF memory region of the remote target device when the CMB bit is enabled or remotely accesses the PMR region of the NVMeoF memory region of the remote target device when the PMR bit is enabled via a remote connection without accessing the CMB region or the PMR region of the NVMeoF memory region of the remote target device via a Peripheral Component Interconnect express (PCIe) connection;
  receive one of (a) PropertyGet/PropertySet completion queue entries from the remote target device when accessing the NVMeoF memory region of the remote target device is completed, or (b) Remote Direct Memory Access (RDMA) write or RDMA read requests from the remote target device in response to PropertyGet/PropertySet submission queue entries; and
  receive completion queue entries from the remote target device when the accessing of the NVMeoF memory region of the remote target device is completed.

6. The host CPU of claim 5, wherein the PropertyGet/Property Set commands comprise at least one of a PropertyGet command that causes the NVMeOF memory region of the remote target device to be read from and a PropertySet command that causes the NVMeoF memory region of the remote target device to be written to.

7. The host CPU of claim 6, wherein a Data Pointer (DPTR) field is added to the PropertyGet/Property Set commands by the host CPU.

* * * * *